Figure 1:
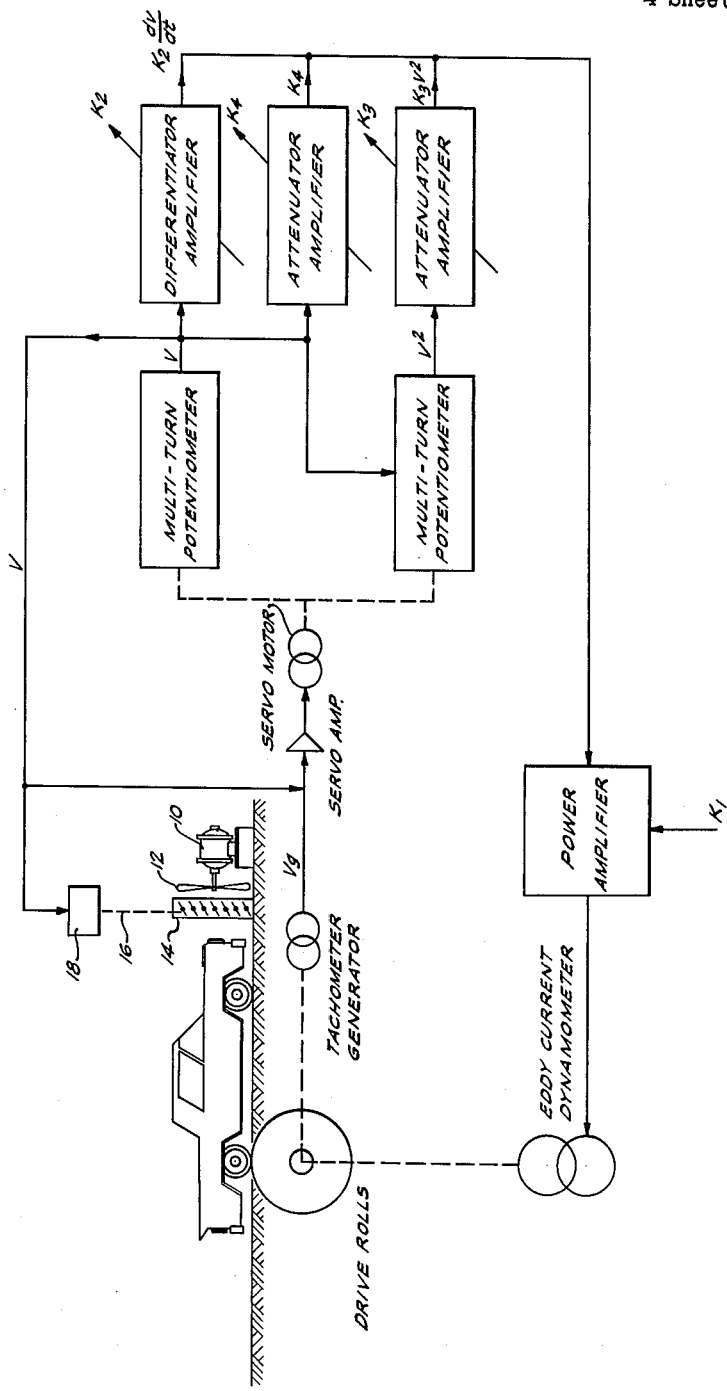

INVENTORS
JOSEPH G. HUFFMAN
CHARLES C. MOORE

ATTORNEY

Oct. 9, 1962  J. G. HUFFMAN ETAL  3,057,192
CHASSIS DYNAMOMETER
Filed Sept. 21, 1959  4 Sheets-Sheet 2

INVENTORS:
JOSEPH G. HUFFMAN
CHARLES C. MOORE
BY
Richard C. Hartman
ATTORNEY 3,057,192
CHASSIS DYNAMOMETER
Joseph G. Huffman, Brea, and Charles C. Moore, Fullerton, Calif., assignors to Union Oil Company of California, Los Angeles, Calif., a corporation of California
Filed Sept. 21, 1959, Ser. No. 841,196
15 Claims. (Cl. 73—117)

This invention relates to a chassis dynamometer, and in particular relates to a device for determining the performance of an automotive vehicle under simulated road conditions.

In the manufacture of fuels and lubricants for automotive vehicles, as well as in the design and manufacture of such vehicles themselves, it is of great value to be able to determine the performance of the vehicle in the laboratory or manufacturing plant under simulated road conditions. A testing device, usually referred to as a "chassis dynamometer," is commonly employed for such purpose. In general, such a device comprises means whereby the power developed at the driving wheels of the test vehicle is delivered to a set of drive rolls which is mechanically coupled to a dynamometer. When the dynamometer is of the eddy-current type, the power applied to the dynamometer is consumed in creating eddy-currents which are eventually dissipated in the form of heat. In certain of such devices the dynamometer is loaded mechanically with weights or by braking and the effect of the wind is simulated with fans or blowers, whereas in others the dynamometer is loaded electrically by applying a current of known magnitude to the field winding thereof. In both instances, however, it is substantially impossible to load the dynamometer to simulate road loading with any substantial degree of accuracy.

It is accordingly an object of the present invention to provide an improved chassis dynamometer.

Another object is to provide a chassis dynamometer which is capable of presenting to the test vehicle a load which accurately reproduces that presented under actual road conditions.

A further object is to provide an improved method for electrically loading a dynamometer of the eddy-current type.

Other and related objects will be apparent from the following detailed description of the invention, and various advantages thereof not specifically referred to herein will occur to those skilled in the art as the description proceeds.

We have now found that the foregoing objects and related advantages may be realized in a chassis dynamometer of the eddy-current type in which the dynamometer itself is loaded electrically and in which the loading current is varied as a complex function of the "speed" of the test vehicle. During testing, the latter is of course fixed with respect to the dynamometer, but since the velocity at which the wheels of the test vehicle drive the rotor of the dynamometer is strictly proportional to the speed which the vehicle would travel were it free to move on a roadbed, it is convenient to refer to the velocity of the wheels as the "speed" of the vehicle itself.

In any wheeled vehicle traveling on a surface, the torque load on the driving wheels consists of (1) surface friction, (2) inertia, and (3) wind resistance. Surface friction is substantially constant and is a function of the weight of the vehicle, the condition of the tires, the road surface, etc. Inertia is a direct function of the weight of the vehicle and the rate of change of speed, i.e. the acceleration. The wind resistance is a direct function of the square of the speed (at least at the speeds developed by conventional surface vehicles). Since these forces are additive, the total torque can be expressed as:

$$F = K_1 + K_2 \frac{ds}{dt} + K_3 s^2$$

where $s$ is the speed of the vehicle and $K_1$, $K_2$ and $K_3$ are constants which are characteristic of the particular vehicle and/or road surface. Accordingly, a chassis dynamometer which is adapted to present accurately simulated road conditions to a test vehicle must be capable of being loaded in accordance with the above formula. In practice, this can be accomplished conveniently with a dynamometer of the eddy-current type which is loaded electrically as previously explained. We have found, however, that even such a dynamometer is not capable of simulating true road conditions at high acceleration. This arises out of an inherent characteristic of the dynamometer itself, namely, its self-induction, which is manifested by a time lag between application of the current to the dynamometer field winding and the development of the resulting load at its rotor. In order to cancel out the effect of such inductive lag there must be included in the foregoing loading equation a factor which compensates for such inductive lag. Finally, since the load imposed on the test vehicle includes the friction of the moving parts of the testing equipment itself, e.g., the drive rolls, mechanical couplings, the dynamometer rotor, etc., the equation must include a factor which is representative of the friction of the testing system itself. This latter factor can be combined with that representing the friction of the vehicle since both are constants determined by the particular test vehicle and test system. Summing up these various factors, the load which must be presented to the test vehicle (i.e., the current which must be supplied to the field winding of the eddy-current dynamometer) becomes:

$$I = K_1 + K_2 \frac{di}{dt} + K_3 \frac{di^2}{dt} + A$$

where I is the total excitation current; "$i$" is a current directly proportional to the "speed" of the test vehicle; $K_1$ is a fixed current which is determined by the characteristics of the test vehicle and the testing system, $K_2$ and $K_3$ are proportionality constants which are likewise characteristic of the test vehicle; and A is a current which compensates for the inductive lag of the dynamometer at high acceleration. The nature of A is more fully discussed hereinafter. Since it is more convenient to handle voltage signals than current signals, the loading excitation is initially generated as a complex voltage signal which is then fed to a power amplifier for conversion to a corresponding current signal. The voltage signal which must be supplied to the power amplifier is thus:

$$V = K_1 + K_2 \frac{dv}{dt} + K_3 v^2 + A'$$

wherein the constants are the voltage equivalents of the current constants defined above, "$v$" is a voltage which is proportional to the "speed" of the test vehicle, and A' is the voltage equivalent to the A current factor defined above. The device in which the objects of the invention are realized is characterized by means for generating a voltage equal to V in the above equation.

Figure 2:
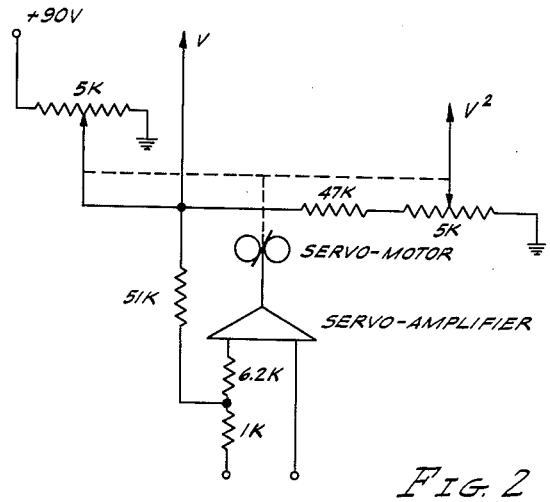
Figure 3:
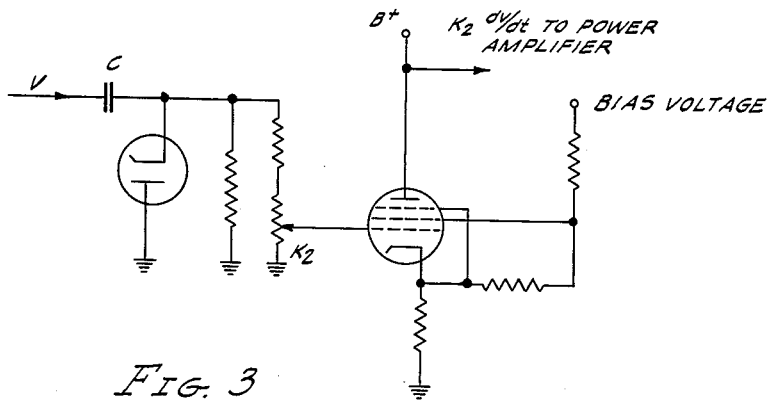
Figure 4:
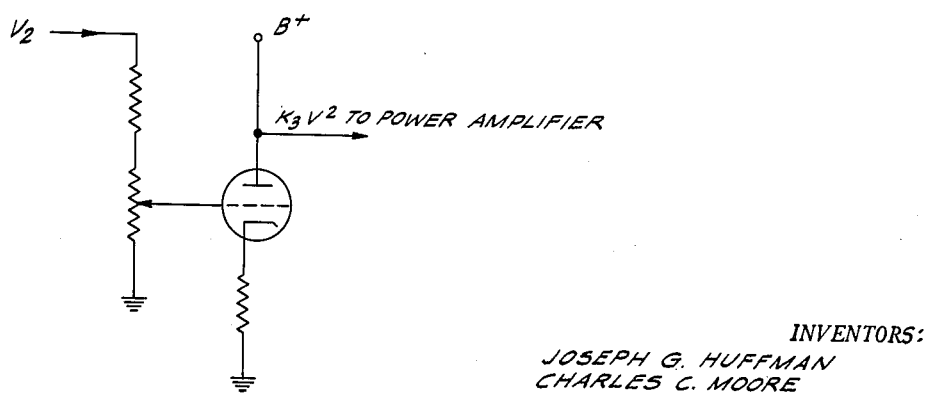
Figure 5:
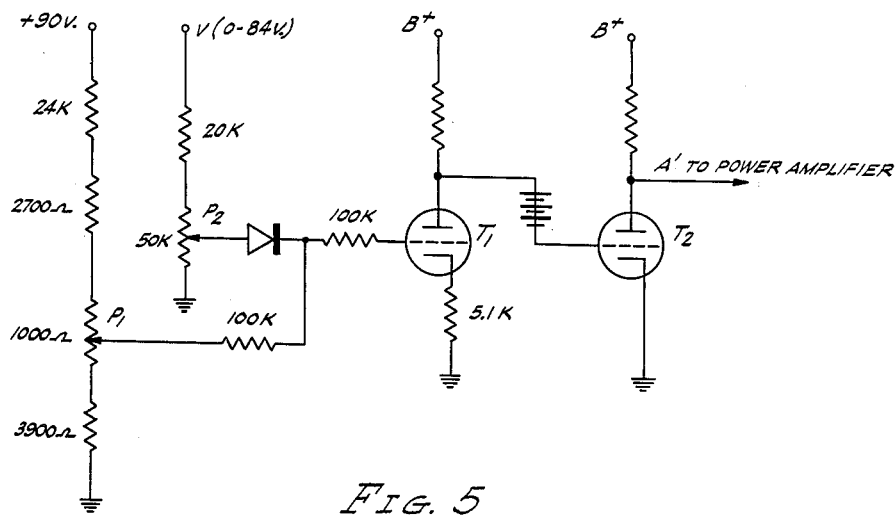
Figure 6:
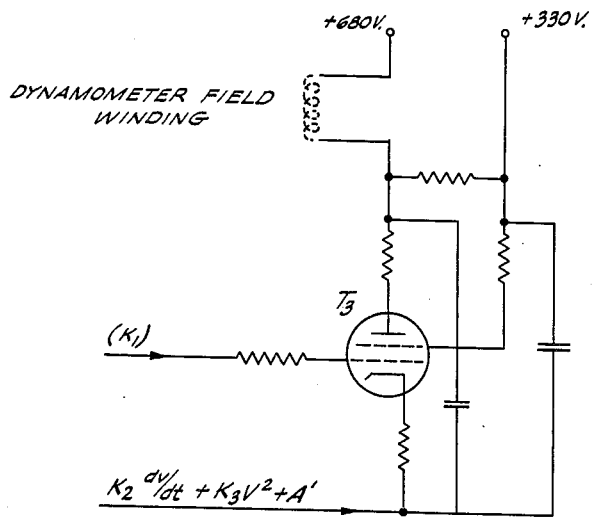
Figure 7:
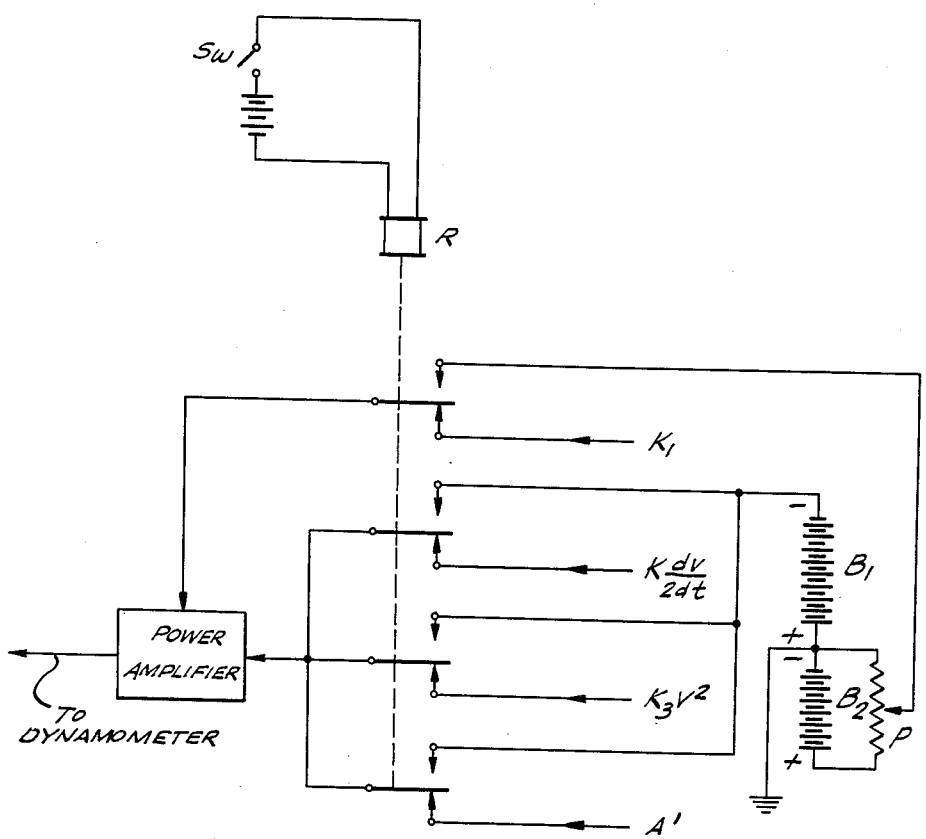

In the drawings which form a part of this application, FIGURE 1 is in part a block diagram illustrating the general scheme of a chassis dynamometer system embodying the principles of the invention, and in part a schematic illustration of a means for duplicating the cooling effect of the wind on a test vehicle; FIGURE 2 illustrates an electrical circuit for producing a signal equal to the square of an input signal; FIGURE 3 illustrates a circuit for producing a signal proportional to the first derivative (with respect to time) of an input signal; FIGURE 4 illustrates a circuit for producing a signal proportional to the squared signal produced as shown in FIGURE 2; FIGURE 5 illustrates a circuit for producing a signal to compensate for the aforementioned inductive lag of an eddy-current dynamometer; FIGURE 6 illustrates a suitable power amplifier circuit and FIGURE 7 illustrates a means for applying a braking signal to the dynamometer so as to simulate deceleration of the test vehicle.

Referring now to the drawings, and more particularly to FIGURE 1 thereof, it will be seen that the system is a closed mechanical-electrical loop. The torque delivered by the driving wheels of the test vehicle is applied via direct friction contact to the drive rolls which are mechanically coupled to a tachometer generator and to the rotor of an eddy-current dynamometer. The output of the tachometer generator is a voltage signal which is fed through a servo-amplifier to a servo-motor which mechanically drives two multi-turn potentiometers. The output of the one potentiometer is a velocity signal which is proportional to the "speed" of the test vehicle. A portion of said signal is returned as feedback to the servo system. A second portion drives a differentiator-amplifier circuit which produces a voltage signal equal to $$K_2 \frac{dv}{dt}$$

A third portion of the velocity signal is passed to an attenuator-amplifier which produces a voltage signal equal to $A'$. A fourth portion of the velocity signal is passed to the second multi-turn potentiometer which produces a voltage signal equal to $v^2$. The latter is then passed through an attenuator-amplifier to obtain $K_3 v^2$. The voltage signals thus produced are combined and are passed to a power amplifier, together with a fixed or reference voltage equal to $K_1$. The output of the power amplifier, equal to $$K_1 + K_2 \frac{di}{dt} + K_3 i^2 + A$$

is passed to the field winding of the eddy-current dynamometer, thereby loading the dynamometer rotor which is driven by the drive rolls. As is apparent, the load opposing the torque developed by the driving wheels of the test vehicle is thus the aforementioned complex function of the "speed" of the vehicle itself, and is compensated for the nonlinear response of the dynamometer at high acceleration as well as for the friction of the test vehicle and the testing system itself.

Considering now the component parts of the system illustrated by FIGURE 1, the eddy-current dynamometer, the drive rolls, and the mechanical coupling therebetween are all of conventional design. Excellent results have been obtained with a 300 H.P. Midwest Model 1519 dynamometer chain driven by a set of conventional drive rolls. The tachoemter generator is likewise conventional, and is preferably of the D.C. permanent magnet type capable of delivering a signal of about 100 volts/1000 r.p.m. of roll speed under the load imposed by the servo-amplifier which it feeds. Suitably, the tachometer generator is gear driven from the drive roll shaft.

The servo system, including the servo-amplifier and servo-motor, and the potentiometers which are mechanically driven thereby are likewise of conventional design and construction. Because of the loading imposed by the subsequent circuiting, particularly the differentiator-amplifier, it is desirable to isolate the tachometer generator from such circuitry by an impedance transformer or equivalent device. According to a preferred embodiment, this is accomplished by mechanically connecting the servo-motor to a potentiometer connected across a suitable reference voltage source. The output of the tachometer generator is passed to the servo-amplifier and the amplified signal drives the servo-motor and thus determines the position of the potentiometer arm which in turn picks off a portion of the reference voltage. The potentiometer output signal is thus directly proportional to the output from tachometer generator (i.e., to the "speed" of the test vehicle) but is electrically isolated therefrom. As previously stated, a portion of the potentiometer output signal is returned to the servo-amplifier to supply the necessary feedback signal, a portion is fed to a second potentiometer which is likewise driven by the servo-motor and which hence produces an output signal equal to the square of the speed signal, and the remainder is employed as hereinafter described.

FIGURE 2 is a schematic diagram of a servo system as described above, and adapted to receive a 0–84 v. D.C. signal from a D.C. tachometer generator and to convert it to (1) a first voltage signal which is a linear analog of the "speed" of the test vehicle, and (2) a voltage signal which is the square of said first voltage signal. The resistance and reference voltage values are applicable to a Minneapolis Honeywell Brown servo-amplifier and servo-motor mechanically coupled to the arms of two "Helipot" 5000-ohm potentiometers.

Considering now the differentiator-amplifier, one form of which is schematically shown in FIGURE 3, as previously explained, this portion of the circuitry produces the $$K_2 \frac{dv}{dt}$$

component of the loading signal which is eventually fed to the dynamometer. As will be apparent from FIGURE 3, this is accomplished by passing the velocity signal $v$ through a conventional RC circuit comprising a large capacitance C (10 mf., for example) and a resistance network. The diode serves to by-pass any negative values of $v$. The total voltage developed across the resistance network is approximately equal to $$\frac{dv}{dt}$$

and the potentiometer selects that portion which corresponds to $$K_2 \frac{dv}{dt}$$

The latter signal is passed to the pentode amplifier (suitably a type 6SH7 vacuum tube) which is cathode biased in order to provide Class A amplification, and the amplified signal is passed directly to the power amplifier.

FIGURE 4 shows a typical attenuator-amplifier circuit for producing the $K_3 v^2$ signal. The $v^2$ signal is taken directly from the squaring potentiometer and is passed to ground through a potentiometer; the setting of the latter thus corresponds to $K_3$. The signal is then triode-amplified (suitably via one-half of a type 6SL7 vacuum tube) and is passed directly to the power amplifier.

FIGURE 5 schematically illustrates the method of generating the signal $A'$ which compensates for the inductive lag of the eddy-current dynamometer. As previously stated, the dynamometer does not respond immediately to the application of a loading current to its field winding. Usually the lag is of the order of 2–4 seconds. Such time lag can be compensated by deliberately overloading the dynamometer for such period and thereafter removing the overload. In accordance with the invention this is accomplished using a portion of the velocity signal $v$. When the test vehicle is idling or running at some essentially negligible "speed" and is then accelerated to some substantially higher speed, the time required to reach said higher "speed" is an essentially linear function of said higher "speed." Hence under such conditions, the velocity signal $v$ increases linearly with time, and the lapse of time can be measured by the magnitude of the velocity signal. Thus, if it be determined experimentally that the dynamometer lag exists for 3 seconds, and also that the velocity signal rises from essentially 0 to "x" volts in 3 seconds, then compensation for the dynamometer lag can be had by overloading the same and then removing the overload when the velocity signal reaches a value of "x." Accordingly, means must be provided whereby the compensating signal is automatically cut off at some particular value of $v$, said value being determined by the characteristics of the test vehicle and the dynamometer. Also, means must be provided for varying the magnitude of the compensating signal over the range of velocities at which it is applied. In the circuit shown in FIGURE 5, the cut-off "speed" is selected by $P_2$ and the magnitude of the compensating signal is selected by $P_1$. From the resistance values, it will be seen that the voltage picked off the velocity signal by $P_2$ can be varied over a considerably larger range than that picked off the 90 v. fixed signal by $P_1$. The latter can be varied between about 11 and about 13.5 volts, whereas the former can be varied between about 0 and about 60 volts. At relatively high "speeds," then, a relatively large positive signal, mostly comprised of the velocity signal derived from $P_2$, is applied to the grid of $T_1$, causing it to conduct and driving $T_2$ beyond cut-off. Thus, no compensating signal is applied to the dynamometer field winding at the higher "speeds." At low "speeds," however, the signal applied to the grid of $T_1$ is much smaller, being made up largely of the signal derived from $P_1$, and the grid of $T_2$ is not driven to cut-off and a compensating signal is applied from the plate of $T_2$ via the power amplifier to the dynamometer field winding. The magnitude of such signal is thus determined primarily by $P_1$. $P_2$, on the other hand, selects the point at which $T_2$ is driven to cut-off, i.e., it selects the "speed" at which no compensating signal is provided. $T_1$ and $T_2$ may suitably be combined in a type 6SL7 vacuum tube. It will be noted that $T_1$ and $T_2$ are battery coupled. This type of coupling is employed to enable operation of $T_2$ at a relatively low (e.g. 80 v.) plate voltage so that the signal taken from the plate of $T_2$ can be fed directly to the cathode of the power amplifier as hereinafter more fully explained.

In addition to those factors in the loading equation which are proportional to the "speed" of the test vehicle and the factor which compensates for the inductive lag of the dynamometer, there are two factors which are independent of "speed" and which are determined by the characteristics of the test vehicle and the testing system. These are combined in the $K_1$ term in the loading equation. As will be apparent, the vehicle friction is a positive factor (i.e., it represents an increase in the load which must be applied to the dynamometer field winding), whereas the testing system friction is a negative factor since it goes to reduce the electrically applied load by the amount of the mechanical load imposed by the friction of the testing system. $K_1$ is thus the difference between the two types of friction, and since that of the test vehicle is larger than that of the testing system, the $K_1$ factor has a positive value. This factor is conveniently produced by connecting a potentiometer across a reference voltage source (suitably about +90 v.) and picking off a voltage signal equal to $K_1$, and is passed directly to the power amplifier.

The power amplifier circuitry is conventional, and may conveniently comprise twelve type 807 vacuum tubes operating in parallel. With the exception of the $K_1$ signal the individual loading signals produced by the circuits previously described are negative, and are hence combined and applied to the cathodes of the 807's which are operated with a fixed grid bias of about 50 v. and at a plate voltage of about 680 v. The $K_1$ signal, being positive, is applied to the grids of the 807's. The dynamometer field winding is connected in series with the plate supply, whereby the output of power amplifier is coupled directly to the dynamometer, and the load imposed on the dynamometer rotor (and hence on the driving wheels of the test vehicle) varies with the "speed" of the test vehicle and is compensated for all friction forces and the dynamometer lag in accordance with the loading equation previously given. FIGURE 6 schematically illustrates a suitable power amplifier circuit, with $T_3$ representing twelve type 807 vacuum tubes connected in parallel.

The values of $K_1$, $K_2$ and $K_3$ can be calculated from known or measured data characteristic of the particular test vehicle. However, such data are difficult to obtain and the calculations are relatively complex. Usually it is simpler and more accurate to set these values empirically as follows: The test vehicle is fitted with a fifth wheel coupled to a tachometer generator whose output is coupled to a speed recording device adapted to plot a curve of speed vs. time. Such curve is usually termed the "road performance curve" of the vehicle. The vehicle so equipped is then taken out on the road and its road performance curve or curves are obtained for one or more pre-selected throttle settings. The test vehicle is then placed on the chassis dynamometer which has been equipped with a similar recording device driven by the tachometer generator. The test vehicle is then run on the chassis dynamometer at the same preselected throttle settings, and the potentiometers which determine the values of $K_1$, $K_2$ and $K_3$ are adjusted until the dynamometer performance curve or curves exactly match the road performance curve or curves. These potentiometer settings are characteristic of the particular test vehicle involved, and are not changed so long as that vehicle is being tested. The settings of $P_1$ and $P_2$ (FIGURE 5) which determine the nature and magnitude of the compensating factor $A'$ are likewise determined empirically. We have found that for motor cars powered by internal combustion engines satisfactory compensation is attained by setting $P_2$ to cut off the compensation signal at a "speed" of about 30 m.p.h.

As will be apparent to those skilled in the art, various means other than those explained can be employed to produce the various signals which make up the total loading signal which is applied to the dynamometer field winding. Thus, the $K_3v^2$ signal can be generated by purely electronic means, and the $K_2\,dv/dt$ signal can be generated by mechanical-electrical or pneumatic-electrical means. Similarly, the electronic circuits shown in drawings are given by way of example only and can be replaced by similar circuits capable of performing the same functions. It will further be apparent that any of the auxiliary equipment commonly employed in conjunction with chassis dynamometer devices may be employed with the present system. Thus, a portion of the "speed" signal taken from the tachometer generator (or the velocity signal $v$ taken from the velocity potentiometer) can be employed to operate a speed indicator and/or to control a blower mounted in front of the test vehicle and serving to reproduce the cooling effect of wind on the engine. Conventionally, such blowers are powered by an electric motor whose speed (and hence the velocity of the wind generated by the blowers) is varied in accordance with the "speed" of the test vehicle. Such arrangements, however, are made costly and cumbersome by the large size motor required and the difficulty in accurately controlling its speed. We have found that the wind velocity can be controlled much more easily by running the blower itself at constant speed and varying the velocity of the air stream by interposing in the path thereof louvers whose position is controlled by the magnitude of the velocity signal. Referring back to FIGURE 1, a constant speed motor 10 is shown operating a blower schematically shown at 12. A set of adjustable louvers 14 is mounted in front of blower 12; louvers 14 are opened and closed by a mechanical linkage 16 connecting them to controller 18. The latter may comprise any of the well known means for converting a voltage signal into a linear mechanical movement, e.g., an amplidyne or servo system or a pneumatic device. A very suitable controller comprises a pneumatic relay which transducers a D.C. voltage signal to an air signal whose pressure varies directly with the applied voltage, and a "Conoflow" type actuator which translates air pressure to mechanical motion. Since air speed is not a straight line function of louver position, the actuator is preferably connected to the louver operating arm through a cam which is cut to compensate for such non-linearity of response. If desired, the louvers can be located behind the blower rather than between the same and the front of the test vehicle; in some instances this is the preferred type of installation. Other methods of translating the velocity signal to a corresponding louver position will occur to those skilled in the art.

A useful item of optional equipment comprises an electric "brake" by means of which the "speed" of the test vehicle can be quickly reduced without using the braking system of the vehicle itself. Such equipment suitably comprises a set of relays which are controlled by a braking switch and which, when energized, substitute a pre-selected relatively high fixed voltage signal for the various voltage signals produced as described above. The application of such signal through the power amplifier to the dynamometer field winding imposes a heavy load on the drive rolls and the test vehicle, thereby providing the desired braking action. Suitably, the magnitude of the braking signal is variable so that the severity of the braking action can be controlled at will. Referring now to FIGURE 7 which schematically illustrates a suitable form of electric brake, R is a four-pole double-throw relay which is energized by closing switch Sw. The four individual voltage signals, generated as hereinbefore described, are fed through the respective relay contacts to the power amplifier and thence to the field winding of the eddy dynamometer, so that when Sw is open the system operates as previously described. When Sw is closed and the relay is energized the signals corresponding to $$K_2 \frac{dv}{dt}, \ K_3 v^2$$

and A' (which are negative in value) are replaced by a high fixed negative voltage produced by battery $B_1$, thereby heavily loading the dynamometer and slowing down the wheels of the test vehicle mounted on the dynamometer rolls. In order to control the severity of the braking action, the signal corresponding to $K_1$ (which is positive) is replaced, upon energizing the relay, by a variable positive voltage picked off battery $B_2$ by potentiometer P.

Other modes of applying the principle of our invention may be employed instead of those explained, change being made as regards the elements employed, provided the apparatus defined by any of the following claims, or the equivalent of such defined apparatus, be constructed or employed.

We, therefore, particularly point out and distinctly claim as our invention:

1. A chassis dynamometer system for presenting simulated road conditions to an automotive wheeled vehicle comprising, in combination: a drive roll adapted to cooperate and be rotated by a driving wheel of said vehicle; an eddy-current dynamometer comprising a rotor and a field winding, said rotor being mechanically connected to said drive roll so as to be rotated thereby; means for generating a first voltage signal proportional to the velocity of said driving wheel and representative of the speed of said vehicle; means for producing a second voltage signal which is proportional to the difference between the road friction of said vehicle and the internal friction of said chassis dynamometer system; means operated by said first voltage signal for producing a third voltage signal proportional to the square of said first voltage signal, said third voltage signal being representative of the wind resistance of said vehicle; means operated by said first voltage signal for producing a fourth voltage signal which is proportional to the first derivative with respect to time of said first voltage signal, said fourth voltage signal being representative of the inertia of said vehicle; means for producing a fifth voltage signal for compensating the characteristic inductive lag of said dynamometer, said last-named means being inoperative during such time as the magnitude of said first voltage signal exceeds a pre-selected value; power amplifier means receiving said second, third, fourth and fifth voltage signals and producing a current signal which is proportional to the sum of said received voltage signals; and means for applying said current signal to the field winding of said dynamometer.

2. A chassis dynamometer system as defined by claim 1 wherein said means for generating said first voltage signal comprises a tachometer generator which produces an output signal proportional to the velocity of said driving wheel; a servo-motor controlled by said output signal; a potentiometer connected across a fixed voltage source; and means whereby the arm of said potentiometer is driven by said servo-motor, whereby said first voltage signal is produced at said arm of said potentiometer.

3. A chassis dynamometer system as defined by claim 2 wherein said means for producing said third voltage signal comprises a second potentiometer connected across said first voltage signal; and means whereby the arm of said second potentiometer is driven by said servo motor, whereby said third voltage signal is produced at said arm of said second potentiometer.

4. A chassis dynamometer system as defined by claim 1 including means for controlling the magnitude of said fifth voltage signal and means for varying the value of the magnitude of said first signal at which said means for producing said fifth signal is rendered inoperative.

5. A chassis dynamometer system as defined by claim 1 wherein said power amplifier means is a pentode amplifier.

6. A chassis dynamometer system as defined by claim 5 wherein said third, fourth and fifth voltage signals are negative with respect to ground and are supplied to the cathode of said pentode amplifier, and said second voltage signal is positive with respect to ground and is applied to the control grid of said pentode amplifier.

7. A chassis dynamometer system as defined by claim 1 including means for producing an airstream to simulate the cooling effect of the wind on said vehicle, said airstream-producing means comprising an air blower operating at a substantially constant speed, and means operative in response to said first voltage signal for varying the velocity of the airstream produced by said blower in direct relationship to the magnitude of said first voltage signal.

8. A chassis dynamometer system as defined by claim 7 wherein said means for varying the velocity of said airstream comprises adjustable louvers, powered means for adqusting said louvers, and means responsive to the magnitude of said first voltage signal for controlling said powered means.

9. A chassis dynamometer system for presenting simulated road conditions to an automotive wheeled vehicle, comprising, in combination: a drive roll adapted to cooperate with and be rotated by a driving wheel of said vehicle; an eddy-current dynamometer comprising a rotor and a field winding, said rotor being mechanically connected to said drive roll so as to be rotated thereby; means for generating a first voltage signal proportional to the velocity of said driving wheel and representative of the speed of said vehicle; means for producing a second voltage signal which is proportional to the difference between the road friction of said vehicle and the internal friction of said chassis dynamometer system; means operated by said first voltage signal for producing a third voltage signal proportional to the square of said first voltage signal, said third voltage signal being representative of the wind resistance of said vehicle; means operated by said first voltage signal for producing a fourth voltage signal, said fourth voltage signal being representative of the inertia of said vehicle which is proportional to the first derivative with respect to time of said first voltage signal; means for producing a fifth voltage signal for compensating the characteristic inductive lag of said dynamometer, said last-named means being operative only during the period of time required for an increase in the current applied to the field winding of said dynamometer to effect a similar increase in the load thereby imposed on the rotor of said dynamometer; power amplifier means connected to receive said second, third, fourth and fifth voltage signals and producing a current signal which is proportional to the sum of said received voltage signals; and means for applying said current signal to the field winding of said dynamometer.

10. A chassis dynamometer system as defined by claim 9 including means for producing an airstream to simulate the cooling effect of the wind on said vehicle, said airstream-producing means comprising an air blower operating at a substantially constant speed, and means operative in response to said first voltage signal for varying the velocity of the airstream produced by said blower in direct relationship to the magnitude of said first voltage signal.

11. A chassis dynamometer system as defined by claim 9 wherein said means for generating said first voltage signal comprises a tachometer generator which produces an output signal proportional to the velocity of said driving wheel; means for amplifying said output signal; a servo-motor driven by the amplified output signal; a potentiometer connected across a fixed voltage source; and means whereby the arm of said potentiometer is driven by said servo-motor, whereby said first voltage signal is produced at the arm of said potentiometer.

12. A chassis dynamometer system as defined by claim 11 wherein said means for producing said third voltage signal comprises a second potentiometer connected across said first voltage signal, and means whereby the arm of said second potentiometer is driven by said servomotor, whereby said third voltage signal is produced at said arm of said second dynamometer.

13. A chassis dynamometer system as defined by claim 9 including means for producing a sixth voltage signal substantially larger in magnitude than the sum of said second, third, fourth and fifth voltage signals; and switching means for connecting said sixth voltage signal to said power amplifier and disconnecting said second, third, fourth and fifth voltage signals from said power amplifier.

14. In a chassis dynamometer system for presenting simulated road conditions to an automotive wheeled vehicle and comprising: a drive roll adapted to cooperate with and be rotated by a driving wheel of said vehicle, an eddy-current dynamometer comprising a rotor and a field winding, said rotor being mechanically connected to said drive roll so as to be rotated thereby, means for generating a voltage signal proportional to the velocity of said driving wheel and representative of the speed of said vehicle, and means for applying to said field winding a loading current signal which is a function of the velocity of said driving wheel, the combination therewith of means for applying an inductive lag compensating current signal to said field winding, and means for rendering said last named means inoperative when the magnitude of said voltage signal exceeds a pre-selected value.

15. A chassis dynamometer system as defined by claim 1 in combination with means for producing an air stream directed along the longitudinal axis of said test vehicle, and means responsive to the velocity of said driving wheel for varying the velocity of said air stream in proportion to the velocity of said driving wheel.

References Cited in the file of this patent

UNITED STATES PATENTS

| 2,417,745 | Findley et al. | Mar. 18, 1947 |
| 2,436,346 | Wrathall et al. | Feb. 17, 1948 |
| 2,655,612 | Jaeschke | Oct. 13, 1953 |
| 2,982,128 | Gibson et al. | May 2, 1961 |

FOREIGN PATENTS

| 531,787 | Great Britain | Jan. 10, 1941 |

UNITED STATES PATENT OFFICE
CERTIFICATE OF CORRECTION

Patent No. 3,057,192                          October 9, 1962

Joseph G. Huffman et al.

It is hereby certified that error appears in the above numbered patent requiring correction and that the said Letters Patent should read as corrected below.

Column 8, line 29, for "servo motor" read -- servo-motor --; line 58, for "adqusting" read -- adjusting --; column 9, lines 5 to 8, for ", said fourth voltage signal being representative of the inertia of said vehicle which is proportional to the first derivative with respect to time of said first voltage signal" read -- which is proportional to the first derivative with respect to time of said first voltage signal, said fourth voltage signal being representative of the inertia of said vehicle --; column 9, line 43, for "servomotor" read -- servo-motor --.

Signed and sealed this 21st day of May 1963.

(SEAL)
Attest:

ERNEST W. SWIDER
Attesting Officer

DAVID L. LADD
Commissioner of Patents